United States Patent
Lee et al.

(10) Patent No.: US 7,660,531 B2
(45) Date of Patent: Feb. 9, 2010

(54) REMOTE ACCESS UNIT AND RADIO-OVER-FIBER NETWORK USING SAME

(75) Inventors: Jae-Hoon Lee, Seoul (KR); Seong-Taek Hwang, Pyeongtaek-si (KR); Byung-Jik Kim, Seongnam-si (KR); Gyu-Woong Lee, Suwon-si (KR); Hoon Kim, Suwon-si (KR); Sang-Ho Kim, Seoul (KR); Yong-Gyoo Kim, Seoul (KR); Sung-Kee Kim, Suwon-si (KR); Han-Lim Lee, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 510 days.

(21) Appl. No.: 11/607,700

(22) Filed: Dec. 1, 2006

(65) Prior Publication Data

US 2007/0133995 A1      Jun. 14, 2007

(30) Foreign Application Priority Data

Dec. 9, 2005    (KR) .................. 10-2005-0120753

(51) Int. Cl.
*H04B 10/24*     (2006.01)
*H04J 4/00*      (2006.01)
*H04M 1/00*      (2006.01)

(52) U.S. Cl. ................ 398/115; 398/41; 370/478; 455/562.1

(58) Field of Classification Search ............... 398/115, 398/41; 370/280, 281, 478; 455/562.1
See application file for complete search history.

(56) References Cited

U.S. PATENT DOCUMENTS

| 6,937,878 | B2 * | 8/2005 | Kim et al. ............... 455/561 |
| 7,085,497 | B2 * | 8/2006 | Tiemann et al. ........... 398/107 |
| 2003/0118280 | A1 * | 6/2003 | Miyazaki et al. ......... 385/24 |
| 2006/0079290 | A1 * | 4/2006 | Seto et al. .............. 455/562.1 |
| 2007/0147273 | A1 * | 6/2007 | Lee et al. ................ 370/280 |

* cited by examiner

*Primary Examiner*—Nathan M Curs
(74) *Attorney, Agent, or Firm*—Cha & Reiter, LLC

(57) ABSTRACT

A remote access unit (RAU) apparatus, coupled to a central station (CS) of an RoF network through at least one optical fiber, and which RAU apparatus includes at least one antenna, includes: first and second antenna ports coupled to the at least one antenna; first and second optical fiber ports coupled to the at least one optical fiber; a first coupler for decoupling a first downstream signal of a first duplexing method and a second downstream signal of a second duplexing method, which are input through the first optical fiber port; a circulator for outputting the first downstream signal input from the first coupler to the first antenna port and outputting a first upstream signal of the first duplexing method input from the first antenna port to the second optical fiber port; and a second coupler for outputting the second downstream signal input from the first coupler to the second antenna port and outputting a second upstream signal of the second duplexing method input from the second antenna port to the second optical fiber port.

20 Claims, 6 Drawing Sheets

REMOTE ACCESS UNIT AND RADIO-OVER-FIBER NETWORK USING SAME

CLAIM OF PRIORITY

This application claims priority under 35 U.S.C. §119 to an application entitled "Remote Access Unit and Radio-over-Fiber Network Using the Same," filed in the Korean Intellectual Property Office on Dec. 9, 2005 and assigned Serial No. 2005-120753, the contents of which are incorporated herein by reference.

BACKGROUND OF THE INVENTION

1. Field of the Invention

The present invention relates generally to a network for wireless communication, and in particular, to a radio-over-fiber (RoF) network in which a central station (CS) is coupled to at least one remote access unit (RAU) using at least one optical fiber.

2. Description of the Related Art

When various wireless communication services, such as second generation (2G), third generation (3G) wireless local area network (WLAN), and portable Internet are provided in a certain area, a plurality of remote access units (RAUs) for supporting the various wireless communication services and a space for the RAUs are required. Thus, schemes for providing various services using a single RAU have been suggested. Using these schemes, the number of RAUs and the number of repeaters can be reduced. Herein, such a repeater amplifies an attenuated signal by being installed between a central station (CS) and an RAU.

Conventional duplexing methods of separating a downstream signal and an upstream signal in a wireless communication network include a frequency division duplexing (FDD) method of assigning different frequencies to downstream and upstream signals and a time division duplexing (TDD) method of assigning different time slots to downstream and upstream signals. To share an RAU, a structure for supporting these different duplexing methods is required.

FIG. 1 illustrates a block diagram of a conventional radio-over-fiber (RoF) network 100. Referring to FIG. 1, the RoF network 100 includes a CS 110 and an RAU 140 coupled to the CS 110 through first and second optical fibers 130 and 135.

The CS 110 includes an electric-to-optical converter (E/O) 120 for converting an electrical signal to an optical signal and an optical-to-electric converter (O/E) 125 for converting an optical signal to an electrical signal.

The E/O 120 is coupled to the first optical fiber 130. The E/O 120 electric-to-optical converts an input first downstream electrical signal $S_{D1}$ of the TDD method to a first downstream optical signal, electric-to-optical 120 converts an input second downstream electrical signal $S_{D2}$ of the FDD method to a second downstream optical signal, and outputs the first and second downstream optical signals to the first optical fiber 130.

The O/E 125 is coupled to the second optical fiber 135 and receives a first upstream optical signal of the TDD method and a second upstream optical signal of the FDD method from the second optical fiber 135. The O/E 125 optical-to-electric converts the first upstream optical signal to a first upstream electrical signal $S_{U1}$ and the second upstream optical signal to a second upstream electrical signal $S_{U2}$. Herein, different time slots are assigned to the first downstream and first upstream electrical signals $S_{D1}$ and $S_{U1}$, and the first downstream and first upstream electrical signals $S_{D1}$ and $S_{U1}$ have the same frequency. The frequency of the first downstream and first upstream electrical signals $S_{D1}$ and $S_{U1}$, a frequency of the second downstream electrical signal $S_{D2}$, and a frequency of the second upstream electrical signal $S_{U2}$ are different from each other.

The RAU 140 includes an O/E 150 for converting an optical signal to an electrical signal, an E/O 175 for converting an electrical signal to an optical signal, a high power amplifier (HPA) 155 for amplifying an input electrical signal with a high gain, a low noise amplifier (LNA) 170 for amplifying an input electrical signal with low noise, a frequency independent circulator (CIR) 160 for performing signal coupling, and an antenna 165.

The O/E 150 is coupled to the first optical fiber 130 and receives the first and second downstream optical signals from the first optical fiber 130. The O/E 150 optical-to-electric converts the first and second downstream optical signals to first and second downstream electrical signals.

One end of the HPA 155 is coupled to the O/E 150, and the other end is coupled to the CIR 160. The HPA 155 amplifies each of the first and second downstream electrical signals input from the O/E 150.

The CIR 160 includes first to third ports, the first port coupled to the HPA 155, the second port coupled to the antenna 165, and the third port coupled to the LNA 170. The CIR 160 outputs the first and second downstream electrical signals input from the HPA 155 through the first port to the antenna 165 through the second port and outputs first and second upstream electrical signals input from the antenna 165 through the second port to the LNA 170 through the third port.

The antenna 165 transmits an electronic wave corresponding to the first and second downstream electrical signals input from the CIR 160 to the air and generates first and second upstream electrical signals by receiving an electronic wave from the air.

One end of the LNA 170 is coupled to the third port of the CIR 160, and the other end is coupled to the E/O 175. The LNA 170 amplifies each of the first and second upstream electrical signals input from the CIR 160.

One end of the E/O 175 is coupled to the LNA 170, and the other end is coupled to the second optical fiber 135. The E/O 175 electric-to-optical converts the first and second upstream electrical signals input from the LNA 170 to first and second upstream optical signals and outputs the first and second upstream optical signals to the second optical fiber 135.

However, the conventional RoF network 100 described above has problems described below.

Since the CIR 160 has a low separation rate, a case where a portion of the first and second downstream electrical signals input from the HPA 155 through the first port is leaked to the LNA 170 through the third port occurs often. In addition, if an error occurs in impedance matching between the antenna 165 and the CIR 160, a portion of the first and second downstream electrical signals output to the antenna 165 through the second port of the CIR 160 may be reflected by the antenna 165 and re-input to the CIR 160 through the second port of the CIR 160.

In addition, since propagation loss in the air is great, power of the first and second upstream electrical signals generated by the antenna 165 are much lower than power of the leaked or reflected noise signal.

Thus, in the above-described cases, quality of the second upstream electrical signal may be significantly degraded. That is, the leaked or reflected noise signal may saturate the LNA 170 or make the E/O 175 malfunction. In the case of the first upstream electrical signal, since a time slot different from a time slot of the first downstream electrical signal is assigned to the first upstream electrical signal, the first upstream electrical signal is not significantly affected by the leaked or reflected noise signal.

SUMMARY OF THE INVENTION

The system and apparatus of the present invention solve at least the above problems and/or disadvantages and provides at least the advantages below. Accordingly, the present invention provides a remote access unit (RAU) that minimizes the affect on an upstream signal and a radio-over-fiber (RoF) network using the same of a leaked or reflected noise signal based on a downstream signal.

In a first embodiment of the present invention, there is provided a remote access unit (RAU), which is included in a radio-over-fiber (RoF) network, is coupled to a central station (CS) of the RoF network through at least one optical fiber, and has at least one antenna, comprising: first and second antenna ports coupled to the at least one antenna; first and second optical fiber ports coupled to the at least one optical fiber; a first coupler for decoupling a first downstream signal of a first duplexing method and a second downstream signal of a second duplexing method, which are input through the first optical fiber port; a circulator for outputting the first downstream signal input from the first coupler to the first antenna port and outputting a first upstream signal of the first duplexing method input from the first antenna port to the second optical fiber port; and a second coupler for outputting the second downstream signal input from the first coupler to the second antenna port and outputting a second upstream signal of the second duplexing method input from the second antenna port to the second optical fiber port.

In a second embodiment of the present invention, there is provided a radio-over-fiber (RoF) network comprising: a central station (CS) for transmitting a first downstream signal of a first duplexing method and a second downstream signal of a second duplexing method and receiving a first upstream signal of the first duplexing method and a second upstream signal of the second duplexing method; and a remote access unit (RAU) coupled to the CS through at least one optical fiber and having at least one antenna, wherein the RAU comprises: first and second antenna ports coupled to the at least one antenna; first and second optical fiber ports coupled to the at least one optical fiber; a first coupler for decoupling the first downstream signal and the second downstream signal, which are input through the first optical fiber port; a circulator for outputting the first downstream signal input from the first coupler to the first antenna port and outputting the first upstream signal input from the first antenna port to the second optical fiber port; and a second coupler for outputting the second downstream signal input from the first coupler to the second antenna port and outputting the second upstream signal input from the second antenna port to the second optical fiber port.

In a third embodiment of the present invention, there is provided a remote access unit (RAU), which is included in a radio-over-fiber (RoF) network, is coupled to a central station (CS) of the RoF network through at least one optical fiber, and has at least one antenna, comprising: first and second antenna ports coupled to the at least one antenna; first and second optical fiber ports coupled to the at least one optical fiber; a first duplexer for separating a first downstream signal of a first duplexing method and a second downstream signal of a second duplexing method, which are input through the first optical fiber port; a circulator for outputting the first downstream signal input from the first duplexer to the first antenna port and outputting a first upstream signal of the first duplexing method input from the first antenna port to the second optical fiber port; and a second duplexer for outputting the second downstream signal input from the first coupler to the second antenna port and outputting a second upstream signal of the second duplexing method input from the second antenna port to the second optical fiber port, wherein the first duplexing method is a time division duplexing (TDD) method, and different time slots are assigned to the first downstream and upstream signals.

BRIEF DESCRIPTION OF THE DRAWINGS

The above embodiments and other features and advantages of the present invention will become more apparent from the following detailed description when taken in conjunction with the accompanying drawing in which.

DETAILED DESCRIPTION OF THE INVENTION

Now, embodiments of the present invention are described herein below with reference to the accompanying drawings. For the purposes of clarity and simplicity, well-known functions or constructions are not described in detail as they would obscure the invention in unnecessary detail.

Figure 1:
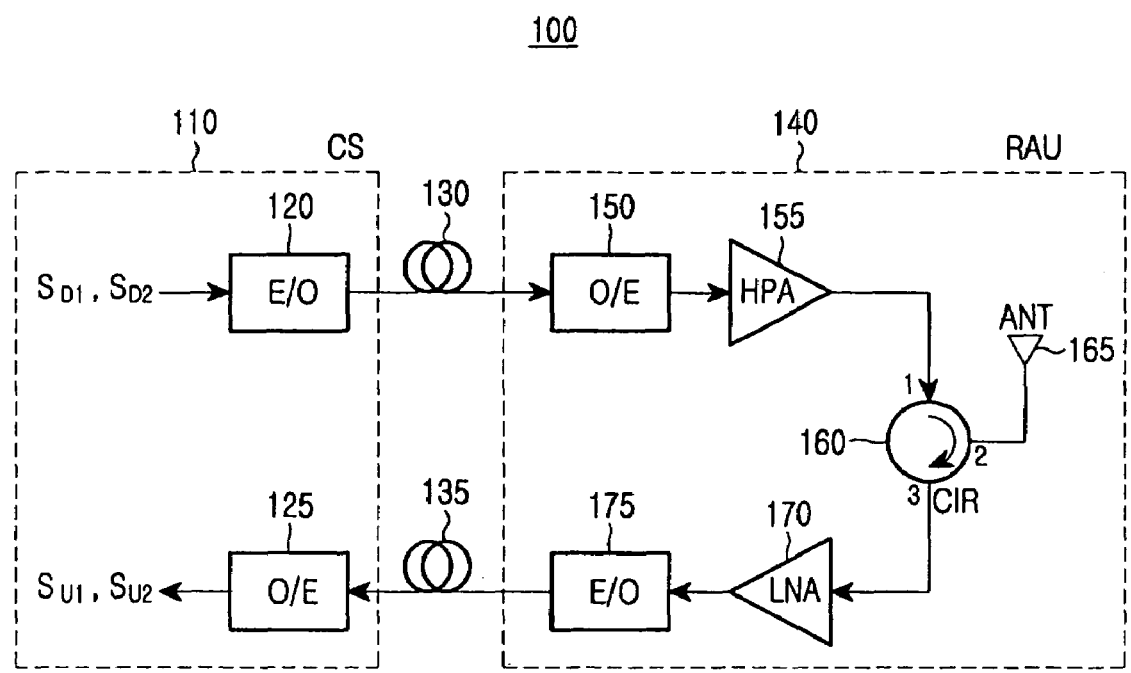
FIG. 1 illustrates a block diagram of a conventional RoF network.
Figure 2:
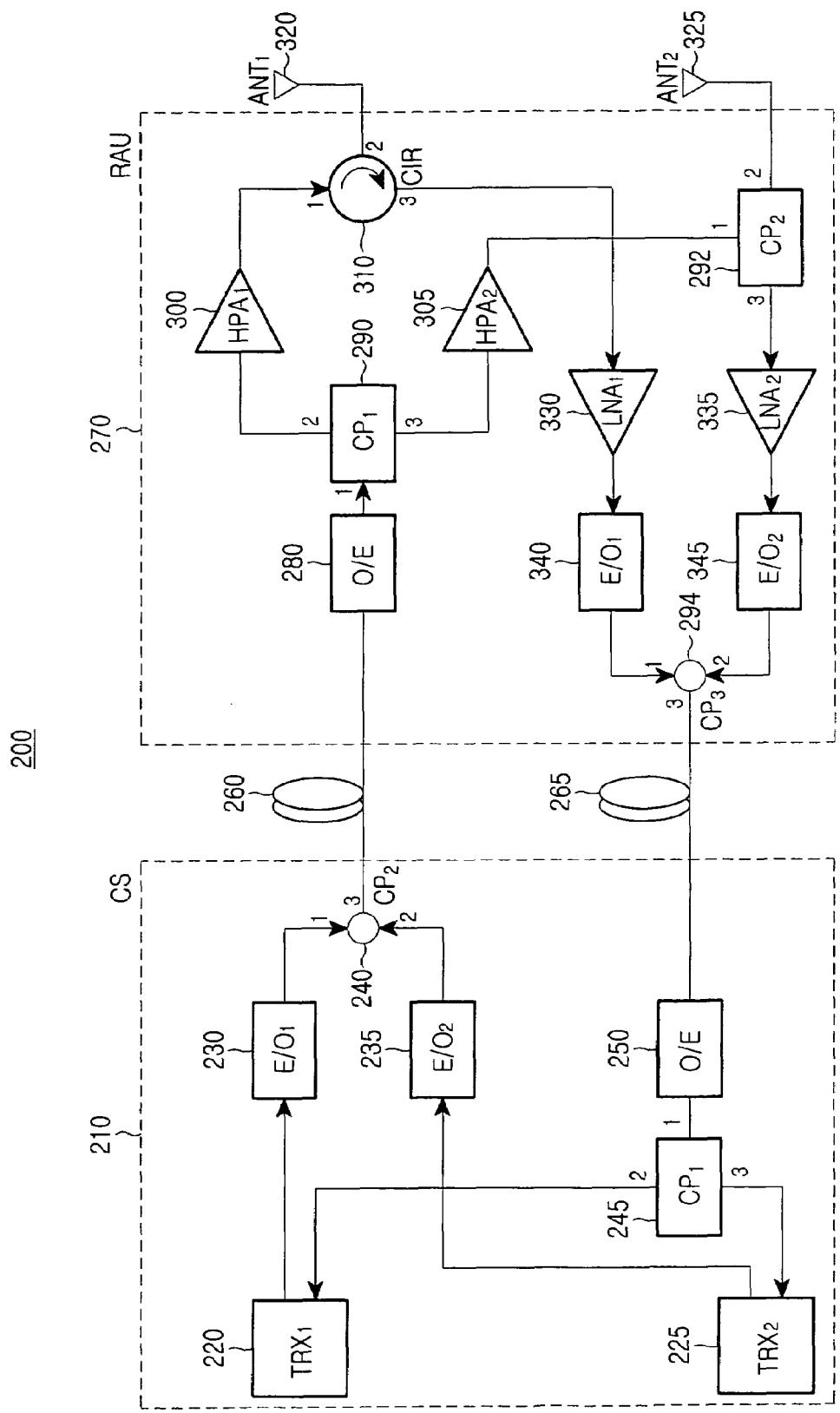
FIG. 2 illustrates a block diagram of an RoF network according to a first preferred embodiment of the present invention.

FIG. 2 is a block diagram of a radio-over-fiber (RoF) network 200 according to a first preferred embodiment of the present invention. Referring to FIG. 2, the RoF network 200 includes a central station (CS) 210 and a remote access unit (RAU) 270 coupled to the CS 210 through first and second optical fibers 260 and 265.

The CS 210 includes a first transceiver (TRX) 220 for transmitting and receiving electrical signals of a first duplexing method, a second TRX 225 for transmitting and receiving electrical signals of a second duplexing method, a second coupler (CP) 240 for coupling optical signals, first and second electric-to-optical converters (E/Os) 230 and 235, each for converting an electrical signal to an optical signal, an optical-to-electric converter (O/E) 250 for converting an optical signal to an electrical signal, and a first CP 245 for decoupling electrical signals having different frequencies.

The first TRX 220 generates and outputs a first downstream electrical signal of the first duplexing method and receives and processes a first upstream electrical signal of the first duplexing method. The second TRX 225 generates and outputs a second downstream electrical signal of the second duplexing method and receives and processes a second upstream electrical signal of the second duplexing method.

In the first embodiment, the first duplexing method is a TDD duplexing method, and the second duplexing method is an FDD duplexing method. Different time slots are assigned to the first downstream and upstream electrical signals, and the first downstream and upstream electrical signals have the same frequency. The frequency of the first downstream and upstream electrical signals, a frequency of the second downstream electrical signal, and a frequency of the second upstream electrical signal are different from each other.

One end of the first E/O 230 is coupled to the first TRX 220, and the other end is coupled to the second CP 240. The first E/O 230 electric-to-optical converts the first downstream electrical signal of the first duplexing method input from the first TRX 220 to a first downstream optical signal and outputs the first downstream optical signal to the second CP 240.

One end of the second E/O 235 is coupled to the second TRX 225, and the other end is coupled to the second CP 240. The second E/O 235 electric-to-optical converts the second downstream electrical signal of the second duplexing method input from the second TRX 225 to a second downstream optical signal and outputs the second downstream optical signal to the second CP 240. A conventional laser diode (LD) or light emitting diode (LED) can be used as each of the first and second E/Os 230 and 235.

The second CP 240 includes first to third ports, the first port coupled to the first E/O 230, the second port coupled to the second E/O 235, and the third port coupled to the first optical fiber 260. The second CP 240 couples the first and second downstream optical signals input from the first and second E/Os 230 and 235 and outputs the coupled first and second downstream optical signals to the first optical fiber 260. A conventional optical combiner for coupling optical signals, e.g., a Y-branch waveguide or a 2×1 directional coupler, can be used as the second CP 240.

One end of the O/E 250 is coupled to the second optical fiber 265, and the other end is coupled to the first CP 245. Herein, one end of the O/E 250 operates as a second optical fiber port. The O/E 250 optical-to-electric converts first and second upstream optical signals input from the second optical fiber 265 to first and second upstream electrical signals and outputs the first and second upstream electrical signals to the first CP 245. A conventional photodiode can be used as the O/E 250.

The first CP 245 includes first to third ports, the first port coupled to the O/E 250, the second port coupled to the first TRX 220, and the third port coupled to the second TRX 225. The first CP 245 decouples the first and second upstream electrical signals input from the O/E 250, outputs the first upstream electrical signal to the first TRX 220, and outputs the second upstream electrical signal to the second TRX 225. In an alternative preferred first embodiment a conventional duplexer is used as the first CP 245.

Figure 3:
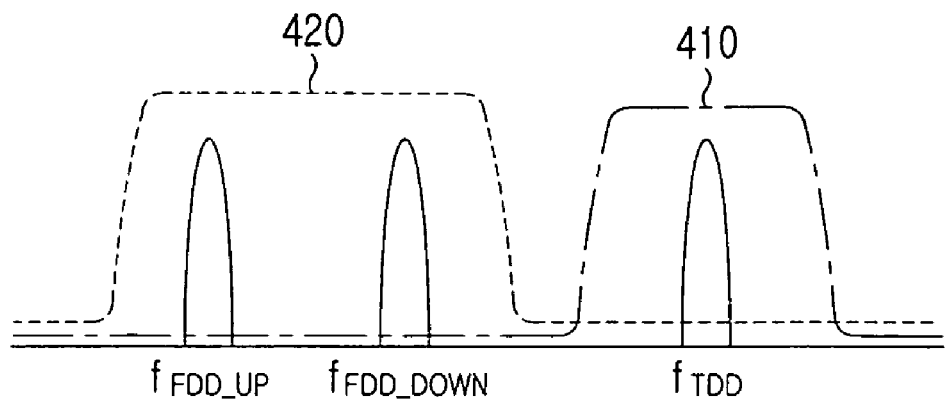
FIG. 3 illustrates a diagram for explaining a frequency characteristic of a first coupler of the CS illustrated in FIG. 2.

FIG. 3 is a diagram for explaining a frequency characteristic of the first CP 245. In FIG. 3, $f_{TDD}$ denotes the frequency of the first downstream and upstream electrical signals, $f_{FDD\_DOWN}$ denotes the frequency of the second downstream electrical signal, and $f_{FDD\_UP}$ denotes the frequency of the second upstream electrical signal. The first CP 245 has a first filtering band 410 including $f_{TDD}$ and a second filtering band 420 including $f_{FDD\_DOWN}$ and $f_{FDD\_UP}$, outputs the first upstream electrical signal passing through the first filtering band 410 to the second port thereof, and outputs the second upstream electrical signal passing through the second filtering band 420 to the third port thereof. Herein, the first filtering band 410 and the second filtering band 420 are not overlapped.

The RAU 270 includes an O/E 280 for converting an optical signal to an electrical signal, a first CP 290 for decoupling electrical signals having different frequencies, first and second high power amplifiers (HPAs) 300 and 305, each for amplifying an input electrical signal with a high gain, a frequency independent circulator (CIR) 310 for coupling electrical signals, a frequency dependent second CP 292 for coupling electrical signals, first and second low noise amplifiers (LNAs) 330 and 335, each for amplifying an electrical signal with low noise, first and second E/Os 340 and 345, each for converting an electrical signal to an optical signal, a third CP 294 for coupling optical signals, and first and second antennas 320 and 325.

One end of the O/E 280 is coupled to the first optical fiber 260, and the other end is coupled to the first CP 290. Herein, one end of the O/E 280 operates as a first optical fiber port. The O/E 280 optical-to-electric converts the first and second downstream optical signals input from the first optical fiber 260 to first and second downstream electrical signals and outputs the first and second downstream electrical signals to the first CP 290. A conventional photodiode can be used as the O/E 280. The first CP 290 includes first to third ports, the first port coupled to the O/E 280, the second port coupled to the first HPA 300, and the third port coupled to the second HPA 305. The first CP 290 decouples the first and second downstream electrical signals input from the O/E 280, outputs the first downstream electrical signal to the first HPA 300, and outputs the second downstream electrical signal to the second HPA 305. The first CP 290 has the frequency characteristic illustrated in FIG. 3.

One end of the first HPA 300 is coupled to the first CP 290, and the other end is coupled to the CIR 310. The first HPA 300 amplifies the first downstream electrical signal input from the first CP 290 with a high gain and outputs the amplified first downstream electrical signal to the CIR 310.

The CIR 310 includes first to third ports, the first port coupled to the first HPA 300, the second port coupled to the first antenna 320, and the third port coupled to the first LNA 330. Herein, the second port of the CIR 310 operates as a first antenna port. The CIR 310 outputs the first downstream electrical signal input from the first HPA 300 through the first port to the first antenna 320 through the second port and outputs first upstream electrical signal input from the first antenna 320 through the second port to the first LNA 330 through the third port.

The first antenna 320 transmits an electronic wave corresponding to the first downstream electrical signal input from the CIR 310 to the air and generates first upstream electrical signal by receiving an electronic wave from the air.

One end of the second HPA 305 is coupled to the first CP 290, and the other end is coupled to the second CP 292. The second HPA 305 amplifies the second downstream electrical signal input from the first CP 290 with a high gain and outputs the amplified second downstream electrical signal to the second CP 292.

The second CP 292 includes first to third ports, the first port coupled to the second HPA 305, the second port coupled to the second antenna 325, and the third port coupled to the second LNA 335. Herein, the second port of the second CP 292 operates as a second antenna port. The second CP 292 outputs the second downstream electrical signal input from the second HPA 305 to the second antenna 325 and outputs second upstream electrical signal input from the second antenna 325 to the second LNA 335. A conventional duplexer can be used as each of the first and second CP 290 and 292.

Figure 4:
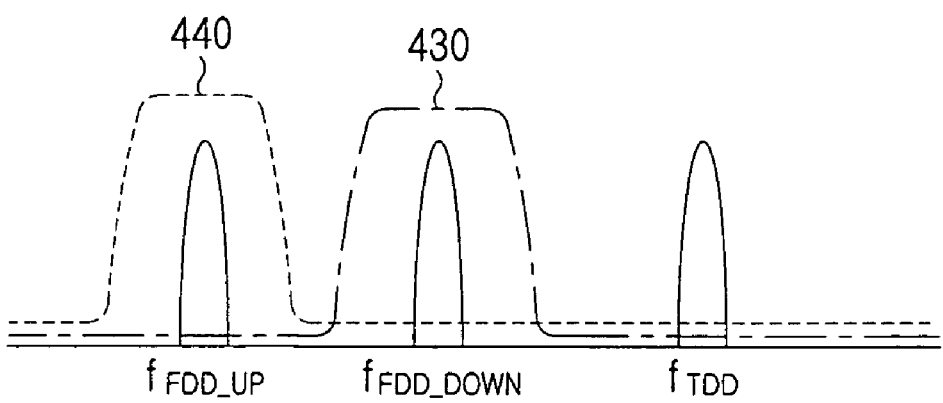
FIG. 4 illustrates a diagram for explaining a frequency characteristic of a second coupler of the RAU illustrated in FIG. 2.

FIG. 4 is a diagram for explaining a frequency characteristic of the second CP 292. In FIG. 4, $f_{TDD}$ denotes the frequency of the first downstream and upstream electrical signals, $f_{FDD\_DOWN}$ denotes the frequency of the second downstream electrical signal, and $f_{FDD\_UP}$ denotes the frequency of the second upstream electrical signal. The second CP 292 has a first filtering band 430 including $f_{FDD\_DOWN}$ and a second filtering band 440 including $f_{FDD\_UP}$, outputs the second downstream electrical signal passing through the first filtering band 430 to the second port thereof, and outputs the second upstream electrical signal passing through the second filtering band 440 to the third port thereof. Herein, the first filtering band 430 and the second filtering band 440 are not overlapped.

The second antenna 325 transmits an electronic wave corresponding to the second downstream electrical signal input from the second CP 292 to the air and generates second upstream electrical signal by receiving an electronic wave from the air.

One end of the first LNA 330 is coupled to the third port of the CIR 310, and the other end is coupled to the first E/O 340. The first LNA 330 amplifies the first upstream electrical signal input from the CIR 310 with low noise and outputs the low noise amplified first upstream electrical signal to the first E/O 340.

One end of the second LNA 335 is coupled to the third port of the second CP 292, and the other end is coupled to the second E/O 345. The second LNA 335 amplifies the second upstream electrical signal input from the second CP 292 with low noise and outputs the low noise amplified second upstream electrical signal to the second E/O 345.

One end of the first E/O 340 is coupled to the first LNA 330, and the other end is coupled to the third CP 294. The first E/O 340 electric-to-optical converts the first upstream electrical signal input from the first LNA 330 to first upstream optical signal and outputs the first upstream optical signal to the third CP 294.

One end of the second E/O 345 is coupled to the second LNA 335, and the other end is coupled to the third CP 294. The second E/O 345 electric-to-optical converts the second upstream electrical signal input from the second LNA 335 to second upstream optical signal and outputs' the second upstream optical signal to the third CP 294. A conventional LD or LED can be used as each of the first and second E/Os 340 and 345.

The third CP 294 includes first to third ports, the first port coupled to the first E/O 340, the second port coupled to the second E/O 345, and the third port coupled to the second optical fiber 265. Herein, the third port of the third CP 294 operates as the second optical fiber port. The third CP 294 couples the first and second upstream optical signals input from the first and second E/Os 340 and 345 and outputs the coupled first and second upstream optical signals to the second optical fiber 265. A conventional optical combiner for coupling optical signals, e.g., a Y-branch waveguide or a 2×1 directional coupler, can be used as the third CP 294.

As described above, according to the first preferred embodiment, even if the first downstream electrical signal is leaked from the CIR 310 or reflected from the first antenna 320 in the RAU 270, since a traveling path of the leaked or reflected noise signal is different from a traveling path of the second upstream electrical signal, quality degradation of the second upstream electrical signal due to the leaked or reflected noise signal does not occur. That is, the leaked or reflected noise signal is input to the first E/O 340 through the first LNA 330, and the second upstream electrical signal is input to the second E/O 345 through the second LNA 335. In addition, since the time slot assigned to the first downstream electrical signal is different from the time slot assigned to the first upstream electrical signal, quality degradation of the first upstream electrical signal due to the leaked or reflected noise signal does not occur.

In addition, to prevent crosstalk, the first and second downstream optical signals have different wavelengths separated by a sufficient wavelength interval from each other, and the first and second upstream optical signals have different wavelengths separated by a sufficient wavelength interval from each other. In the current embodiment and the embodiments described below, the first downstream optical signal, the first upstream optical signal, the second downstream optical signal, and the second upstream optical signal have different wavelengths separated by a sufficient wavelength interval from each other.

Figure 5:
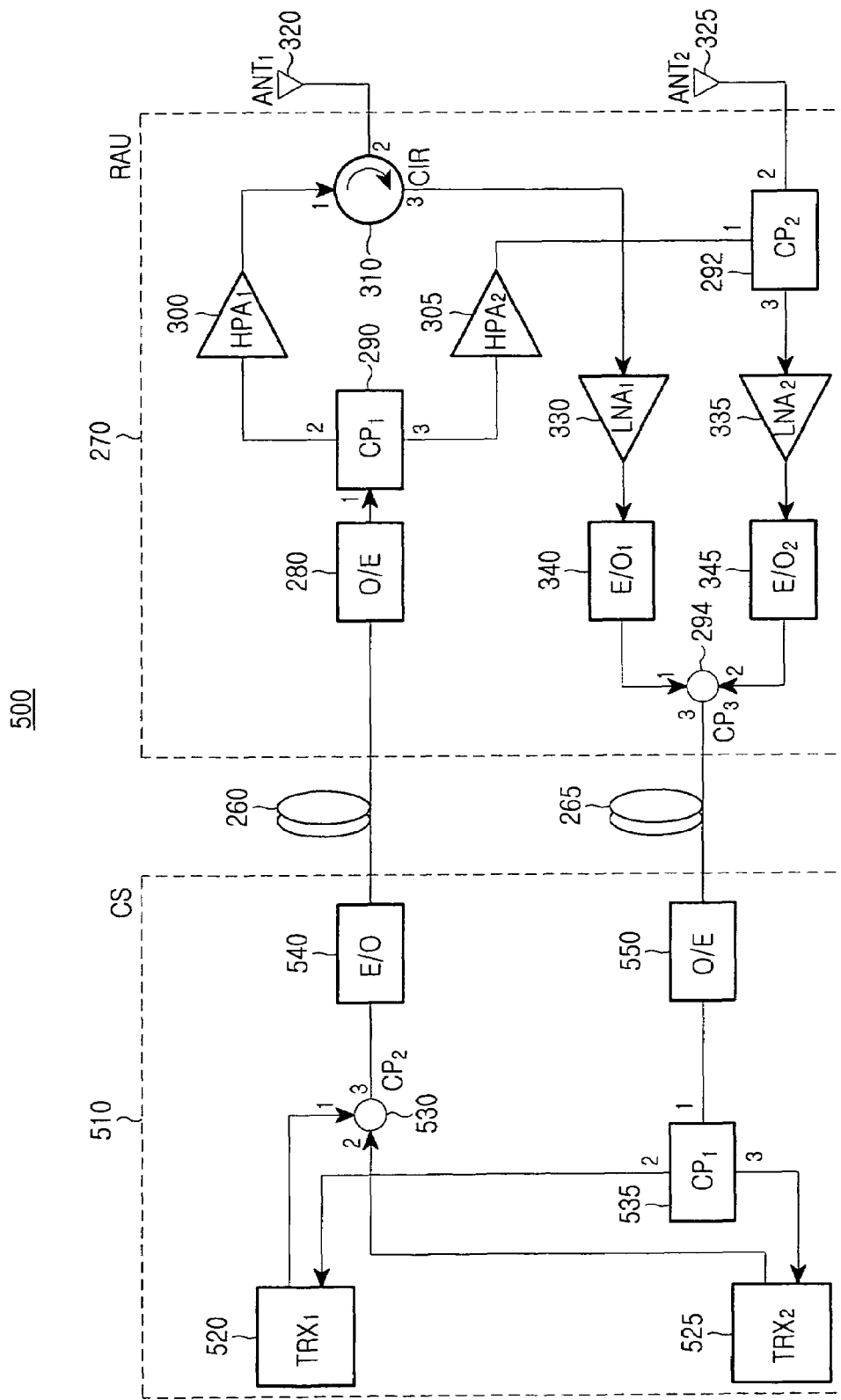
FIG. 5 illustrates a block diagram of an RoF network according to a second preferred embodiment of the present invention.

FIG. 5 is a block diagram of an RoF network 500 according to a second preferred embodiment of the present invention. Referring to FIG. 5, the RoF network 500 includes a CS 510 and the RAU 270 coupled to the CS 510 through the first and second optical fibers 260 and 265. The RoF network 500 is similar to the RoF network 200 illustrated in FIG. 2, and only a configuration of the CS 510 is different. Thus, the same or similar elements are denoted by the same reference numerals, and description already provided for the first embodiment applies to the second embodiment.

The CS 510 includes a first TRX 520 for transmitting and receiving electrical signals of the first duplexing method, a second TRX 525 for transmitting and receiving electrical signals of the second duplexing method, a second CP 530 for coupling optical signals, an E/O 540 for converting an electrical signal to an optical signal, an O/E 550 for converting an optical signal to an electrical signal, and a first CP 535 for decoupling electrical signals having different frequencies.

The first TRX 520 generates and outputs a first downstream electrical signal of the first duplexing method and receives and processes a first upstream electrical signal of the first duplexing method.

The second TRX 525 generates and outputs a second downstream electrical signal of the second duplexing method and receives and processes a second upstream electrical signal of the second duplexing method.

In the current embodiment, the first duplexing method is the TDD duplexing method, and the second duplexing method is the FDD duplexing method. Different time slots are assigned to the first downstream and upstream electrical signals, and the first downstream and upstream electrical signals have the same frequency. The frequency of the first downstream and upstream electrical signals, a frequency of the second downstream electrical signal, and a frequency of the second upstream electrical signal are different from each other.

The second CP 530 includes first to third ports, the first port coupled to the first TRX 520, the second port coupled to the second TRX 525, and the third port coupled to the E/O 540. The second CP 530 couples the first and second downstream optical signals input from the first and second TRXs 520 and 525 and outputs the coupled first and second downstream optical signals to the E/O 540. A conventional optical combiner for coupling electrical signals can be used as the second CP 530.

One end of the E/O 540 is coupled to the third port of the second CP 530, and the other end is coupled to the first optical fiber 260. Herein, the other end of the E/O 540 operates as the first optical fiber port. The E/O 540 electric-to-optical converts the first and second downstream electrical signals input from the second CP 530 to first and second downstream optical signals and outputs the first and second downstream optical signals to the first optical fiber 260. One end of the O/E 550 is coupled to the second optical fiber 265, and the other end is coupled to the first CP 535. Herein, one end of the O/E 550 operates as the second optical fiber port. The O/E 550 optical-to-electric converts first and second upstream optical signals input from the second optical fiber 265 to first and second upstream electrical signals and outputs the first and second upstream electrical signals to the first CP 535.

The first CP 535 includes first to third ports, the first port coupled to the O/E 550, the second port coupled to the first TRX 520, and the third port coupled to the second TRX 525. The first CP 535 decouples the first and second upstream electrical signals input from the O/E 550, outputs the first upstream electrical signal to the first TRX 520, and outputs the second upstream electrical signal to the second TRX 525.

Figure 6:
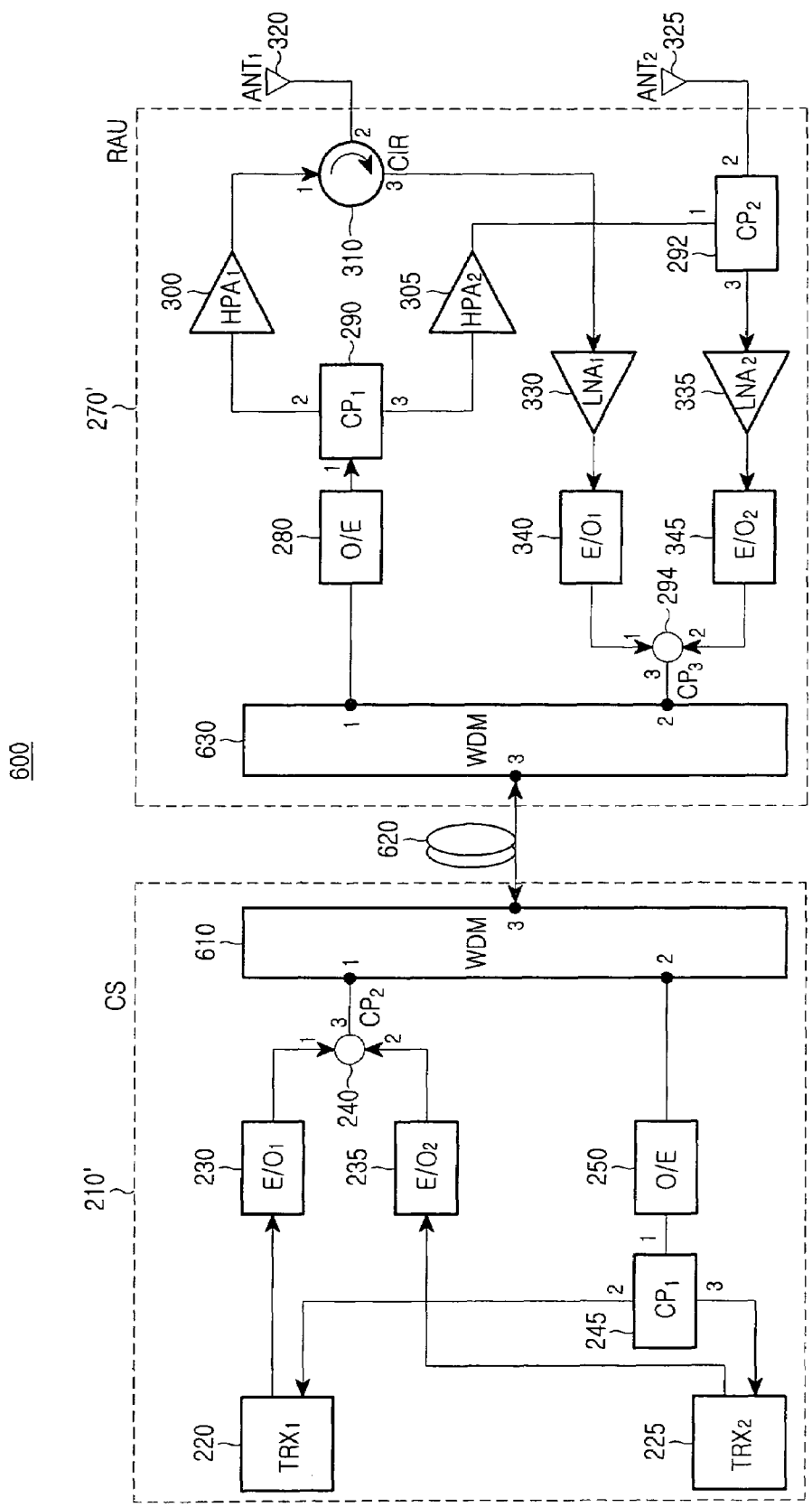
FIG. 6 illustrates a block diagram of an RoF network according to a third preferred embodiment of the present invention.

FIG. 6 is a block diagram of an RoF network 600 according to a third preferred embodiment of the present invention. Referring to FIG. 6, the RoF network 600 includes a CS 210' and an RAU 270' coupled to the CS 210' through an optical fiber 620. The RoF network 600 is similar to the RoF network 200 illustrated in FIG. 2, and there is only a difference that the CS 210' and an RAU 270' further include wavelength division multiplexing (WDM) filters 610 and 630, respectively. Thus, the same or similar elements are denoted by the same reference numerals, and description already provided above for the prior embodiment illustrated in FIG. 2 is omitted.

The WDM filter 610 included in the CS 210' includes first to third ports, the first port coupled to the third port of the second CP 240, the second port coupled to an input terminal of the O/E 250, and the third port coupled to the optical fiber 620. Herein, the first port of the WDM filter 610 or the third port of the second CP 240 operates as the first optical fiber port, and the second port of the WDM filter 610 or the input terminal of the O/E 250 operates as the second optical fiber port. The WDM filter 610 outputs first and second downstream optical signals input from the second CP 240 to the optical fiber 620 and outputs first and second upstream optical signals input from the optical fiber 620 to the O/E 250.

Figure 7:
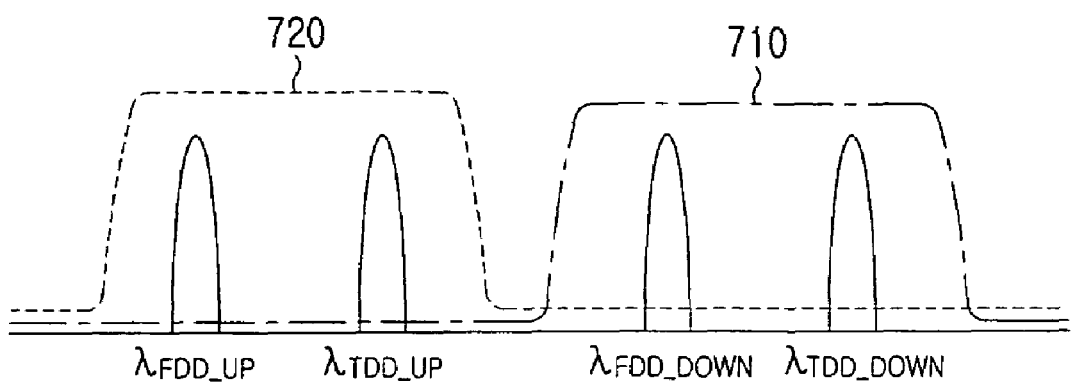
FIG. 7 illustrates a diagram for explaining a frequency characteristic of the wavelength division multiplexing (WDM) filter illustrated in FIG. 6.

FIG. 7 is a diagram for explaining a frequency characteristic of the WDM filter 610. In FIG. 7, $\lambda_{TDD\_DOWN}$ denotes a wavelength of the first downstream optical signal, $\lambda_{TDD\_UP}$ denotes a wavelength of the first upstream optical signal, $\lambda_{FDD\_DOWN}$ denotes a wavelength of the second downstream optical signal, and $\lambda_{FDD\_UP}$ denotes a wavelength of the second upstream optical signal. Herein, $\lambda_{FDD\_UP}$, $\lambda_{TDD\_UP}$, $\lambda_{FDD\_DOWN}$, and $\lambda_{TDD\_DOWN}$ are assigned in the order from a short wavelength to a long wavelength. The WDM filter 610 has a first filtering band 710 including $\lambda_{FDD\_DOWN}$ and $\lambda_{TDD\_DOWN}$ and a second filtering band 720 including $\lambda_{FDD\_UP}$ and $\lambda_{TDD\_UP}$, outputs the first and second downstream optical signals passing through the first filtering band 710 to the third port thereof, and outputs the first and second upstream optical signal passing through the second filtering band 710 to the second port thereof. Herein, the first filtering band 710 and the second filtering band 720 are not overlapped. To realize the above-described wavelength characteristic, the WDM filter 610 can include a beam splitter (not shown) for evenly dividing power of an input optical signal into two, a first bandpass filter (not shown) having the first filtering band 710 and to which a first divided optical signal is input, and a second bandpass filter (not shown) having the second filtering band 720 and to which a second divided optical signal is input.

The WDM filter 630 included in the RAU 270' includes first to third ports, the first port coupled to an input terminal of the O/E 280, the second port coupled to the third port of the third CP 294, and the third port coupled to the optical fiber 620. Herein, the first port of the WDM filter 630 or the input terminal of the O/E 280 operates as the first optical fiber port, and the second port of the WDM filter 630 or the third port of the third CP 294 operates as the second optical fiber port. The WDM filter 630 outputs the first and second downstream optical signals input from the optical fiber 620 to the O/E 280 and outputs the first and second upstream optical signals input from the third CP 294 to the optical fiber 620. The WDM filter 630 has the wavelength characteristic illustrated in FIG. 7.

While the invention has been shown and described with reference to a certain preferred embodiment thereof, it will be understood by those skilled in the art that various changes in form and details may be made therein without departing from the spirit and scope of the invention.

For example, in the third preferred embodiment of the present invention, each of the WDM filter 610 included in the CS 210' and the WDM filter 630 included in the RAU 270' can be replaced with a conventional optical interleaver or a conventional 1×2 arrayed waveguide grating (AWG).

When each of the WDM filters 610 and 630 is replaced with a conventional optical interleaver having first to third ports, $\lambda_{FDD\_UP}$, $\lambda_{FDD\_DOWN}$, $\lambda_{TDD\_UP}$, and $\lambda_{TDD\_DOWN}$ can be assigned in the order from a short wavelength to a long wavelength to have the same wavelength interval. The optical interleaver outputs optical signals having even wavelengths $\lambda_{FDD\_DOWN}$ and $\lambda_{TDD\_DOWN}$, which are input through the first port thereof, through the third port thereof and outputs optical signals having odd wavelengths $\lambda_{FDD\_UP}$ and $\lambda_{TDD\_UP}$, which are input through the third port thereof, through the second port thereof.

In addition, when each of the WDM filters 610 and 630 is replaced with a conventional 1×2 AWG, the wavelengths can be assigned so that $\lambda_{FDD\_UP}$ and $\lambda_{TDD\_UP}$ are separated by a free spectrum interval from each other and $\lambda_{FDD\_DOWN}$ and $\lambda_{TDD\_DOWN}$ are separated by a free spectrum interval from each other. The 1×2 AWG outputs optical signals of a first wavelength group ($\lambda_{FDD\_DOWN}$ and $\lambda_{TDD\_DOWN}$), which are input through the first port thereof, through the third port thereof and outputs optical signals of a second wavelength group ($\lambda_{FDD\_UP}$ and $\lambda_{TDD\_UP}$), which are input through the third port thereof, through the second port thereof.

As described above, in an RAU and an RoF network comprising the RAU according to the present invention, since a traveling path of a leaked or reflected noise signal based on a downstream signal of a first duplexing method is different from a traveling path of an upstream signal of a second duplexing method in the RAU, quality degradation of the upstream signal does not occur.

In addition, when a TDD method is used as the first duplexing method, since time slots assigned to downstream and upstream signals of the TDD method are different from each other, quality degradation of the upstream signal due to a leaked or reflected noise signal based on the downstream signal does not occur.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A remote access unit (RAU) apparatus coupled to a central station (CS) of an RoF network through at least one optical fiber, comprising:
   a first and second antenna port coupled to at least two antennas;
   a first and second optical fiber port coupled to the at least one optical fiber;

a first coupler for decoupling a first downstream signal of a first duplexing method and a second downstream signal of a second duplexing method, which are input through the first optical fiber port;

a circulator for outputting the first downstream signal input from the first coupler to the first antenna port and outputting a first upstream signal of the first duplexing method input from the first antenna port to the second optical fiber port; and a second coupler for outputting the second downstream signal input from the first coupler to the second antenna port and outputting a second upstream signal of the second duplexing method input from the second antenna port to the second optical fiber port.

2. The RAU apparatus of claim 1, further comprising:
a first electric-to-optical converter (E/O), coupled between the circulator and the second optical fiber port, said first EO electric-to-optical converts the first upstream signal input from the circulator, and said first EO outputs the electric-to-optical convened first upstream signal to the second optical fiber port; and
a second E/O, coupled between the second coupler and the second optical fiber port, said second E/O_electric-to-optical converts the second upstream signal input from the second coupler, and said second E/O outputs the electric-to-optical convened second upstream signal to the second optical fiber port.

3. The RAU apparatus of claim 1, further comprising:
a first amplifier, coupled between the circulator and the first E/O, said first amplifier amplifies the first upstream signal input from the circulator, and said first amplifier outputs the amplified first upstream signal to the first E/O; and
a second amplifier, coupled between the second coupler and the second E/O said second amplifier amplifies the second upstream signal input from the second coupler, and said second amplifier outputs the amplified second upstream signal to the second E/O.

4. The RAU apparatus of claim 2, further comprising a third coupler, coupled between the first E/O and second E/O and the second optical fiber port, said third coupler couples the electric-to-optical convened first and second upstream signals input from the first E/O and second E/O, and said third coupler outputs the coupled first and second upstream signals to the second optical fiber port.

5. The RAU apparatus of claim 1, further comprising an optical-to-electric converter (O/E), coupled between the first optical fiber port and the first coupler, said OE optical-to-electric converts the first downstream signal input from the first optical fiber port, and said OE outputs the optical-to-electric converted first downstream signal to the first coupler.

6. The RAU apparatus of claim 1, further comprising:
a first amplifier, coupled between the first coupler and the circulator, said first amplifier amplifies the first downstream signal input from the first coupler, and said first amplifier outputs the amplified first downstream signal to the circulator; and
a second amplifier, coupled between the first coupler and the second coupler, said second amplifier amplifies the second downstream signal input from the first coupler, and said second amplifier outputs the amplified second downstream signal to the second coupler.

7. The RAU apparatus of claim 1, wherein the first duplexing method is a time division duplexing (TDD) method and different time slots are assigned to the first downstream and upstream signals.

8. The RAU apparatus of claim 1, wherein the second duplexing method is a frequency division duplexing (FDD) method and a frequency of the first downstream and upstream signals, a frequency of the second downstream signal, and a frequency of the second upstream signal are different from each other.

9. A radio-over-fiber (RoF) network comprising:
a central station (CS) for transmitting a first downstream signal of a first duplexing method and a second downstream signal of a second duplexing method and said CS receiving a first upstream signal of the first duplexing method and said CS receiving a second upstream signal of the second duplexing method; and
a remote access unit (RAU) coupled to the CS through at least one optical fiber and said RAU having at least two antennas,
wherein, the RAU comprises:
first and second ports to the least one antenna;
first and second optical fiber ports coupled to the at least one optical fiber;
a first coupler for decoupling the first downstream signal and the second downstream signal, which first downstream signal and second downstream signal are input through the first optical fiber port;
a circulator for outputting the first downstream signal input from the first coupler to the first antenna port and said circulator for outputting the first upstream signal input from the first antenna port to the second optical fiber port; and
a second coupler for outputting the second downstream signal input from the first coupler to the second antenna port and said second coupler for outputting the second upstream signal input from the second antenna port to the second optical fiber port.

10. The RoF network of claim 9, wherein the RAU further comprises:
a first electric-to-optical converter (E/O), coupled between the circulator (and the second optical fiber port, said first E/O electric-to-optical converts the first upstream signal input from the circulator, and said first E/O outputs the electric-to-optical converted first upstream signal to the second optical fiber port; and
a second E/O, coupled between the second coupler and the second optical fiber port, said second E/O electric-to-optical converts the second upstream signal input from the second coupler, and said second E/O outputs the electric-to-optical converted second upstream signal to the second optical fiber port.

11. The RoF network of claim 10, wherein the RAU further comprises:
a first amplifier, coupled between the circulator and the first E/O, said first amplifier amplifies the first upstream signal input from the circulator and said first amplifier outputs the amplified first upstream signal to the first E/O; and
a second amplifier, coupled between the second coupler and the second E/O, said second amplifier amplifies the second upstream signal input from the second coupler and said second amplifier outputs the amplified second upstream signal to the second E/O.

12. The RoF network of claim 10, wherein the RAU further comprises a third coupler, coupled between the first E/O and second E/O and the second optical fiber port, said third coupler couples the electric-to-optical convened first and second upstream signals input from the first E/O and second E/O and said third coupler outputs the coupled first and second upstream signals to the second optical fiber port.

13. The RoF network of claim 9, wherein the RAU further comprises an optical-to-electric converter (O/E), coupled between the first optical fiber port and the first coupler, said O/E optical-to-electric converts the first downstream signal input from the first optical fiber pod and said_O/E outputs the optical-to-electric converted first downstream signal to the first coupler.

14. The RoF network of claim 9, wherein the RAU further comprises:
   a first amplifier, coupled between the first coupler and the circulator, said first amplifier amplifies the first downstream signal input from the first coupler, and said first amplifier outputs the amplified first downstream signal to the circulator; and
   a second amplifier, which is coupled between the first coupler and the second coupler, said second amplifier amplifies the second downstream signal input from the first coupler, and said second amplifier outputs the amplified second downstream signal to the second coupler.

15. The RoF network of claim 9, wherein the first duplexing method is a time division duplexing (TDD) method, and different time slots are assigned to the first downstream and upstream signals.

16. The RoF network of claim 9, wherein the second duplexing method is a frequency division duplexing (FDD) method, and a frequency of the first downstream and upstream signals, a frequency of the second downstream signal, and a frequency of the second upstream signal are different from each other.

17. A remote access unit (RAU) apparatus coupled to a central station (CS) of an RoF network through at least one optical fiber comprising:
   first and second antenna ports coupled to at least two antennas;
   first and second optical fiber ports coupled to the at least one optical fiber;
   a first duplexer for separating a first downstream signal of a first duplexing method and a second downstream signal of a second duplexing method, which are input through the first optical fiber port;
   a circulator for outputting the first downstream signal input from the first duplexer to the first antenna port and outputting a first upstream signal of the first duplexing method input from the first antenna port to the second optical fiber port; and
   a second duplexer for outputting the second downstream signal input from the first duplexer to the second antenna port and outputting a second upstream signal of the second duplexing method input from the second antenna port to the second optical fiber port,
   wherein, the first duplexing method is a time division duplexing (TDD) method and different time slots are assigned to the first downstream and upstream signals.

18. The RAU apparatus of claim 17, wherein the second duplexing method is a frequency division duplexing (FDD) method, and a frequency of the first downstream signal, a frequency of the first upstream signal, a frequency of the second downstream signal, and a frequency of the second upstream signal are different from each other.

19. The RAU apparatus of claim 17, further comprising:
   an optical-to-electric converter (O/E), coupled between the first optical fiber port and the first duplexer, said O/E optical-to-electric converts the first downstream signal input from the first optical fiber port, and said O/E outputs the optical-to-electric converted first downstream signal to the first duplexer;
   a first electric-to-optical converter (E/O), coupled between the circulator and the second optical fiber port, said first E/O electric-to-optical converts the first upstream signal input from the circulator, and said first E/O outputs the electric-to-optical converted first upstream signal to the second optical fiber port; and
   a second E/O, coupled between the second duplexer and the second optical fiber port, said second E/O electric-to-optical converts the second upstream signal input from the second duplexer and said second E/O outputs the electric-to-optical converted second upstream signal to the second optical fiber port.

20. The RAU apparatus of claim 19, further comprising:
   a first amplifier, which is coupled between the circulator and the first E/O, said first amplifier amplifies the first upstream signal input from the circulator, and said first amplifier outputs the amplified first upstream signal to the first E/O; and
   a second amplifier, coupled between the second duplexer and the second E/O, said second amplifier amplifies the second upstream signal input from the second duplexer, and said second amplifier outputs the amplified second upstream signal to the second E/O.

\* \* \* \* \*